United States Patent [19]

Tsang

[11] Patent Number: 4,641,323
[45] Date of Patent: Feb. 3, 1987

[54] MULTI-PHASE PSK DEMODULATOR

[76] Inventor: Chung K. Tsang, 175 Bethany Leigh Dr., Scarborough, Ontario M1V 2T6, Canada

[21] Appl. No.: 464,636

[22] Filed: Feb. 7, 1983

[51] Int. Cl.$^4$ .......................................... H04L 27/16
[52] U.S. Cl. ..................................... 375/80; 375/119; 329/112
[58] Field of Search ...................... 375/80, 81, 83, 84, 375/85, 86, 111, 113, 114, 118, 119; 329/110, 112; 455/205, 207

[56] References Cited

U.S. PATENT DOCUMENTS

| | | | |
|---|---|---|---|
| 3,112,448 | 11/1963 | McFarlane et al. | 375/85 |
| 3,815,029 | 6/1974 | Wilson | 375/83 |
| 3,924,197 | 12/1975 | Okano et al. | 329/112 |
| 4,233,565 | 11/1980 | Chmurs | 375/84 |
| 4,281,412 | 7/1981 | Wissel et al. | 329/112 |

Primary Examiner—Robert L. Griffin
Assistant Examiner—Stephen Chin

[57] ABSTRACT

A multi-phase PSK (phase shift key) demodulator is applied to recover a binary encoded serial data from a continuous multi-phase modulated signal source. This demodulator mainly comprises a carrier detect, a hard limiter, a harmonic phase-locked clock regenerator, a digital multi-phase demodulator, a data clock divider and a reference phase synchronizer. The digital multi-phase demodulator applies the output of the harmonic phase-locked clock regenerator and N-th phase rectangular wave PSK signal to produce a demodulated binary encoded parallel data. Then the demodulated parallel data is converted into a serial data via a parallel to serial converter. The reference phase synchronizer can obtain a reference signal through the information of the leader preamble or continuous distributed sync words. Thus a retransmission is not required for phase resynchronization. The regeneration of carrier related clock signal and data demodulation are independent of data pattern if the input signal is preemphasized or conditioned.

12 Claims, 9 Drawing Figures

| QPSK (N=4, n=2) CONTINUOUS PHASE ENCODING ||||
|---|---|---|---|
| POSSIBLE INPUT SIGNALS | AFTER HARD LIMITER | DECODED SERIAL DATE | MODULATION ANGLE |
|  | 1100 | 00 | 0° |
|  | 1001 | 01 | 90° |
|  | 0011 | 10 | 180° |
|  | 0110 | 11 | 270° |
| OTHER COMBINATIONS | ERROR |  |  |

4,641,323

MULTI-PHASE PSK DEMODULATOR

BACKGROUND OF THE INVENTION

The present invention relates to a multi-phase PSK (phase shift key) demodulator.

Important parts of a PSK demodulator circuit normally include a carrier synchronizer (regenerator) and a multi-phase data demodulator means by detecting the input signal with the reproduced carrier. Numerous circuits concerning the carrier synchronizer have been disclosed before including popular ones such as Costas loop, Nth power loop and early-late gates loop. The Costas loop has potential phase detector imbalance problem, whereas the Nth power loop can have "ideal power" problems. And most of these circuits process input signal with analog mixer, phase shifter and voltage summer. In practice, their performance is easily suffered from the circuit impairments such as offset voltage, internal noise and delay accuracy.

SUMMARY OF THE INVENTION

It is an object of the present invention to provide an improved method and apparatus for demodulating a continuous multiphase PSK signal.

It is another object of the invention to recover the carrier clock, symbolic clock and data through the information of a continuous PSK signal's zero-crossing transitions.

It is another object of the invention to obtain a reference phase synchronization through a frame synchronization without retransmission.

It is another object of the invention to recover the data clock and data from a continuous PSK signal without the error introduced from "ideal power" problem or data pattern variation as in Nth power loop.

The present invention, because of the continuous phase modulator input source, provides a simpler structure reproducing the required carrier and encoded data through most digital means.

In accordance with this invention, there is provided a continuous PSK demodulator comprising a full wave rectifier to slice the input signal which has been preconditioned into an uni-polar clock tracking signal, a hard limiter converting the uni-polar signal into a rectangular wave signal, a harmonic phase-locked clock regenerator for reproducing a N-th ($N=2^n$, n being a natural number) time harmonic frequency of the carrier, a frequency divider dividing the harmonic clock signal into a serial data clock, a hard limiter converting the input signal into a N-th rectangular PSK wave, a demodulator translating the N-th rectangular PSK wave into a binary encoded parallel data, a parallel to serial converter converting the parallel data into a serial form, a carrier detect circuit detecting input carrier activity to initialize the following mentioned reference phase synchronizer, a reference phase synchronizer correlating a predetermined pattern preamble of the input signal after initialization by carrier detect circuit to generate a phase pulse chain synchronizing the demodulator and the frequency divider to a proper phase relationship and an input signal source in terms of a message form with a leader preamble period and followed by data field in a continuous N-phase PSK format. In another embodiment, the input signal source further includes a distributed sync word encoding. Thus the reference phase can be obtained again inside the data field by a frame synchronization.

BRIEF DESCRIPTION OF THE DRAWINGS

The invention will now be further described in conjunction with the accompanying drawings, in which.

DETAILED DESCRIPTION OF THE PREFERRED EMBODIMENTS OF THE INVENTION

Figure 1:
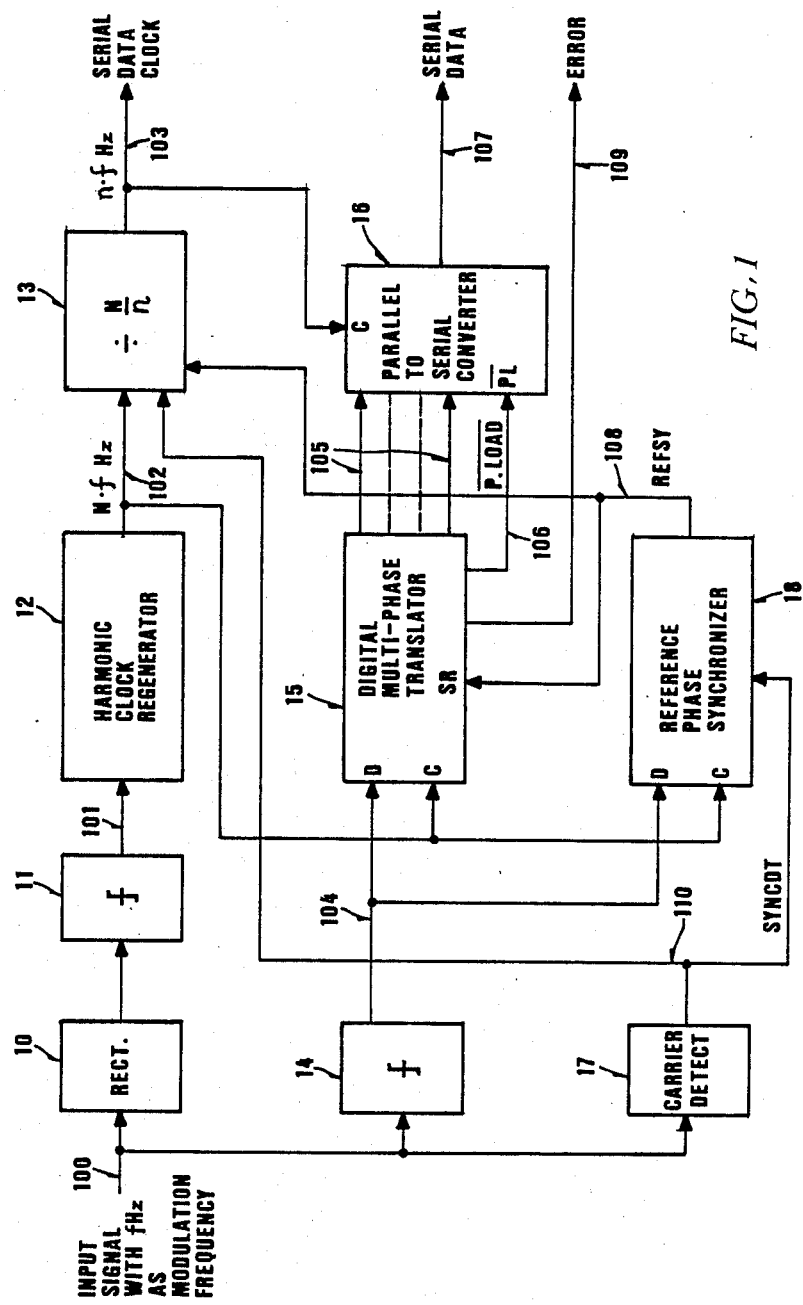
FIG. 1 is a block diagram of a multi-phase PSK demodulator.
Figures 6, 7:
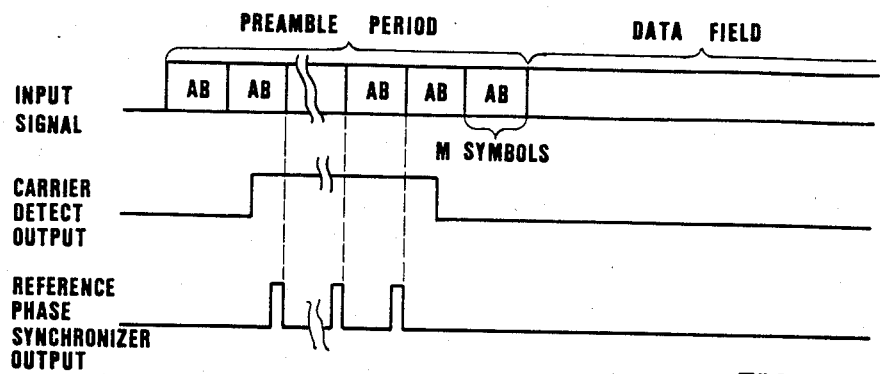
FIG. 6 is a block diagram of an example of an input signal structure and timing relationship to signals generated by a carrier detect and a reference phase synchronizer.
FIG. 7 is a table of a continuous multi-phase PSK signal with $N=4$ example.

Turning now to FIG. 1, a continuous N-phase ($N=2^n$) PSK modulated signal with a modulation frequency f Hz is applied to terminal 100. In this embodiment, the carrier frequency has been assigned same as modulation frequency for convenience but the invention does not prevent the carrier frequency to be a multiple of modulation rate. To the extreme, the N-phase's N number may be other integer. Normally, this input signal is sent by a transmitter in terms of a message form with a preamble pattern leader as shown in FIG. 6. The pattern sync word is M modulated symbols wide and is repeated through out the preamble period. Waveform with different degrees shifted example for a QPSK continuous modulation format is shown in FIG. 7. The leader period is provided for the demodulator's clock regenerator training period and reference phase synchronization.

The PSK modulated signal source applied at terminal 100 is sliced by full wave rectifier 10 into an uni-polar signal. The rectification is to increase the positive transitions which are used for phase tracking. This rectified signal is sensed before applying to an input of harmonic clock regenerator 12. This harmonic clock regenerator 12 produces a N·f Hz clock output which is divided into a serial data clock of n·f Hz by divider 13. The N·f Hz clock from harmonic clock regenerator 12 also applies to inputs of digital multi-phase translator 15 and reference phase synchronizer 18 through circuit path 102. The n·f Hz data clock generated by divider 13 is connected to clock input C of parallel to serial converter 16 through circuit path 103.

The input signal from terminal 100 is also received by hard limiter 14 which converts the PSK signal into a rectangular wave sequence. This N-th digital PSK wave is fed to digital multi-phase translator 15 and reference phase synchronizer 18 through circuit path 104. Digital multi-phase translator 15 also receives the N·f Hz clock frequency through circuit 102 and decodes the data sequence into a n-bit wide parallel output. During the preamble period, translator 15 receives also a chain of reference phase pulse signal REFSY from reference phase synchronizer 18 to reset it to proper phase relationship. During normal data period, a negative active signal $\overline{\text{P. LOAD}}$ is generated at circuit path 106 by digital multi-phase translator 15 to indicate the decoded parallel data ready at circuit path 105. An error signal ERROR is also generated at circuit path 109 if any illegal data sequence is detected (caused by input noise or phase segment slip) by digital multi-phase translator 15. This error signal ERROR can be used externally to request the transmitter to retransmit the initial preamble sequence again. Parallel to serial converter 16 accepts the parallel data from translator 15 through circuit path 105 during $\overline{\text{P. LOAD}}$ low period. It also accepts the serial clock from circuit path 103 to propagate out the serial data to circuit path 107.

Input signal from terminal 100 also applies to carrier detect circuit 17. The moment of detecting the existance of a carrier triggers a one-shot pulse output named SYNCDT at circuit path 110. It is fed to reference phase synchronizer 18 and divider 13. This one shot pulse width should be less than the preamble leader duration. Reference phase synchronizer 18 is enabled to sort for the predetermined pattern code during this one shot active period. Divider 13 also allows the phase synchronization during this period. For every predetermined sync code sorted by reference phase synchronizer 18, there is pulse REFSY generated at the output which is fed to translator 15, divider 13 and parallel to serial converter 16 through circuit path 108.

Figure 2:
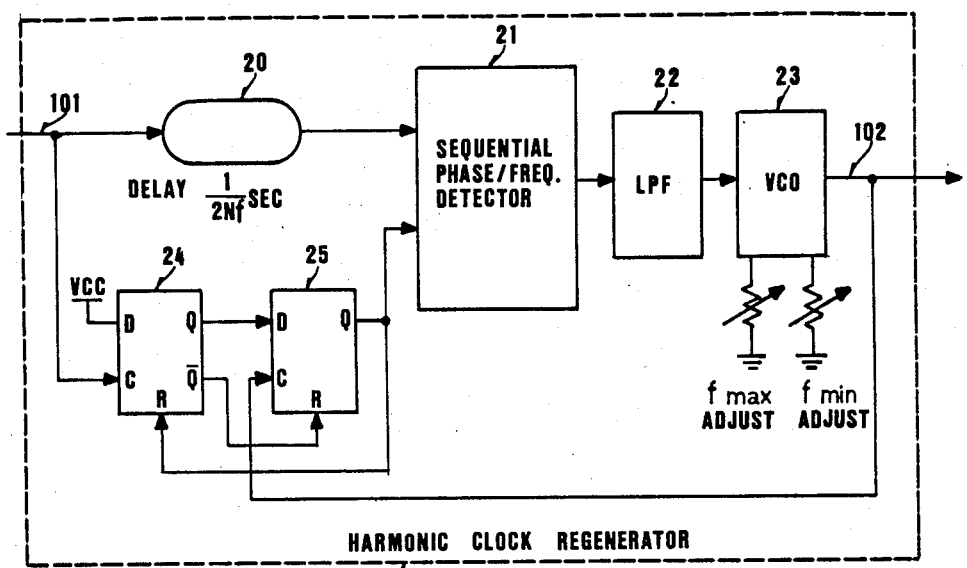
FIG. 2 is a block diagram of a harmonic clock regenerator.

Now turning to FIG. 2, a harmonic clock regenerator is comprised of a non-linear phase locked loop. The output of hard limiter 11 is connected to input of delay device 20 and C on input of flip flop 24 through circuit path 101. The output of delay device 20 is fed to one input of the sequential phase/frequency detector. The data D input of flip flop 24 is connected to VCC (high state). Thus a positive edge of the signal applied to clock input C of flip flop 24 causes its Q output high which applies to D input of flip flop 25. By the time a positive edge of voltage controlled oscillator (VCO) 23 output appears at clock input C of flip flop 25, the high signal applied at D input is clocked to Q output which is fed to another input of sequential phase/frequency detector 21 and reset terminal R of flip flop 24. Thus flip flop 24 is reset. Its $\overline{Q}$ output is fed to reset terminal R of flip flop 25 and causes flip flop 25 reset also. If there is no positive edge applies to C input of flip flop 24, its Q output of flip flop 24 kepts at low. So even when there is a positive edge applied at C input of flip flop 25, there will keep at low at its Q output. Thus as a result, for every positive edge applied to C input of flip flop 24, there is a pulse generated at Q output of flip flop 25 synchronized by positive edge of signal from voltage controlled oscillator (VCO) 23. The positive edge of the incoming signal at circuit path 101 delayed by delay device 20 of ¼ Nf second is phase/frequency compared with the positive edge of the pulse from flip flop 25 Q output by a sequential phase/frequency detector 21. The output is normally a charge-pump tri-state type of which the error signal is filtered by low pass filter (LPF) 22 into a direct current signal. This direct current signal controls the voltage controlled oscillator (VCO) 23 to generate the required N·f Hz output. Voltage controlled oscillator (VCO) 23 provides a frequency maximum adjust, of which the frequency maximum has to be turned less than 2 N·f Hz in order preventing locking to other undesired harmonic frequency. Of course, a narrow pulling range crystal or LC oscillator does not require frequency limit tuning. The output of voltage controlled oscillator (VCO) 23 is also fed back to C input of flip flop 25. Since the positive edges apply to circuit path 101 at different harmonic frequencies and the phase comparison is active only during a positive edge applied at circuit path 101, the system can be considered as a non-linear phase locked loop. Furthermore, if the hard limiter's gain is sufficient, input signal's AM to PM is minimized and the regeneration of N·f Hz output is indepentent to input signals pattern and waveshape.

Figure 3:
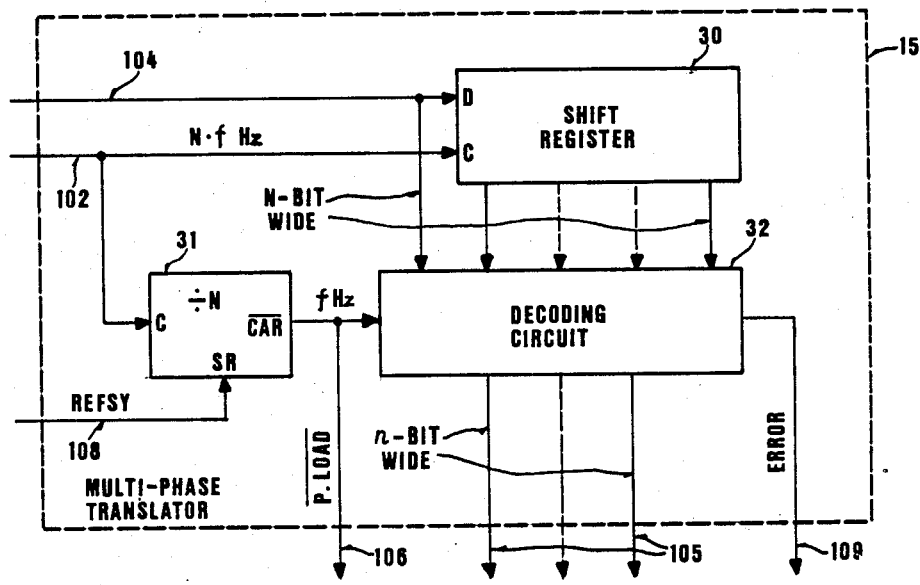
FIG. 3 is a block diagram of a multi-phase translator.

Now turning to FIG. 3, a digital translator is illustrated. It is mainly comprised of a shift register, a decoding circuit and a counter. Shift register 30 receives the N-th digital PSK wave from hard limiter 14 through circuit path 104. The N·f Hz clock signal from harmonic clock regenerator 12 through circuit path 102 clocks the data into the shift register 30. The N−1 bit parallel output of shift register 30 and the last bit applied at line 104 is received by the decoding circuit 32 and is translated into a n-bit parallel output at circuit path 105. Counter 31 is reset at proper phase relationship with data by a signal REFSY from reference phase synchronizer 18 through circuit path 108 applied to its synchronous reset terminal SR. The N·f Hz clock signal applied at circuit path 102 is divided by counter 31 into a carry signal $\overline{\text{P. LOAD}}$ at circuit path 106 indicating decoded data ready at circuit path 105. At the same time, this carry signal from counter 31 is also gated into the decoding circuit to sample the validation of the parallel input. If there is any phase segment slip or wrong data sequence, it is sensed by the decoding circuit 32 and a signal ERROR is outputed at circuit path 109. This ERROR signal line 109 is useful and valid for all N-phase PSK encoding except binary case (N=2). An example of a QPSK (N=4, n=2) decoding relationship is shown in FIG. 7.

Figure 4:
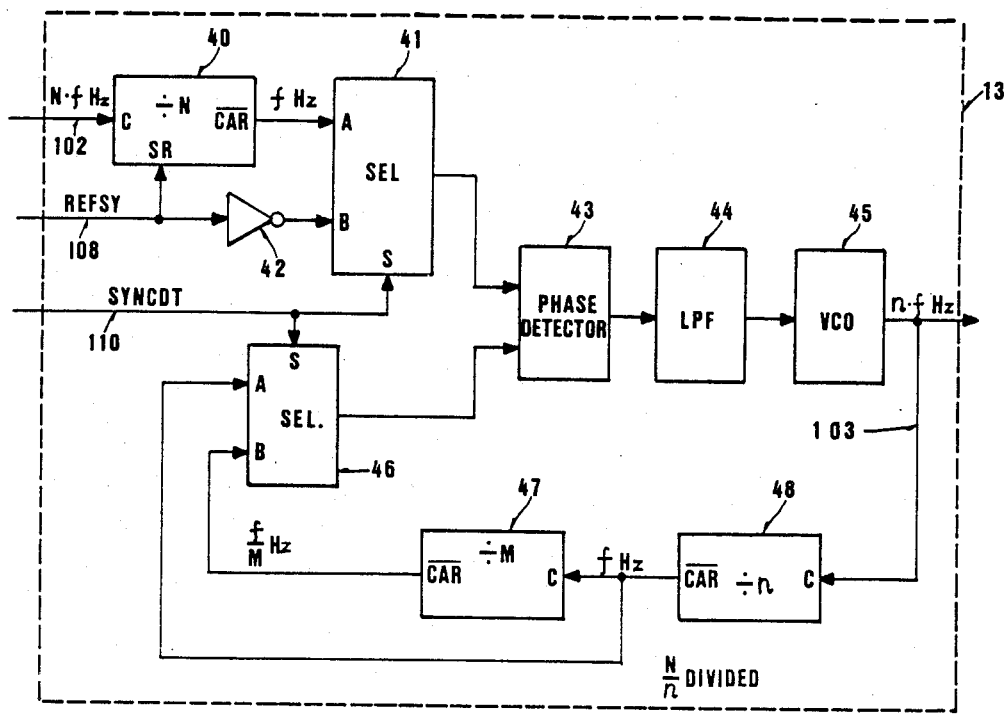
FIG. 4 is a block diagram of a data clock divider.

Turning now to FIG. 4, an universal divider is shown to convert a N·f Hz harmonic clock frequency into a n·f Hz serial clock rate. Of course, if N/n is an integer, a simple digital dividing counter with reset input as shown in FIG. 1 is sufficient. However, the ratio of N/n is not always an integer, a phase locked loop is applied for the divider of genreal case in FIG. 4. The N·f Hz clock signal applied at circuit path 102 is divided by counter 40 into a carry signal of f Hz. This f Hz frequency is normally routed through selector 41 to one input of phase detector 43. The n·f Hz clock rate generated by voltage controlled oscillator (VCO) 45 is divided by counter 48 into a carry signal of f Hz which is also normally routed through selector 46 to another input of phase detector 43. The phase detector 43 compares these two input signals' positive edge phases to produce an error signal which is filtered by low pass filter (LPF) 44. The phase detector may be comprised of a D-type flip flop, an exclusive OR-gate, a charge-pump type or other edge comparison detector, although a sequential phase/frequency charge-pump type is preferred. The filtered direct current signal from low pass filter (LPF) 44 applies to an input of voltage controlled oscillator (VCO) 45 to produce the required n·f Hz frequency output at circuit 103. During the preamble period indicated by the signal SYNCDT genrated from carrier detect 17 output applied at circuit path 110, the phase locked loop is enabled to track the reference phase signal REFSY in order to achieve the N/n divider phase synchronization. The reference phase pulse signal REFSY applies at circuit path 108 which is connected to synchronous reset input SR of counter 40 and an input of inverter 42. Counter 40 is reset synchronously with this reference phase signal REFSY. Inverter 42 inverts the reference phase signal to proper edge same as the carry output of counter 40. The signal SYNCDT from carrier detect 17 output is connected to select S inputs of selector 41 and 46 through circuit path 110. During the signal SYNCDT is active on circuit path 110 within preamble period, selctor 41 selects input from invert 42 output and selector 46 selects input from counter 47's carry output. Since the sync pattern word inside the preamble period is M modulated symbols wide, the reference phase signal REFSY is f/M Hz and counter 47 dividing ratio should be M in order to match the comparing frequencies. At a result, the N/n divider accepts a signal REFSY f/M Hz from reference phase synchronizer 18 for phase tracking during carrier detect 17 output active period and switches to accept the normal N·f Hz harmonic clock regenerator 102 output for phase tracking during normal data period while counters 40 and 48 are synchronized.

Figure 5:
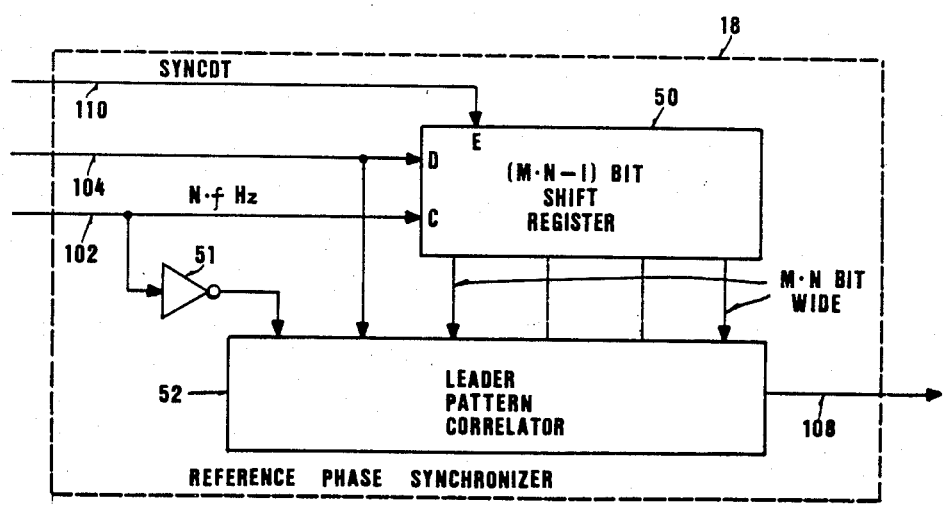
FIG. 5 is a block diagram of a reference phase synchronizer.

Now turning to FIG. 5, a reference phase synchronizer 18 comprises a shift register, an inverter and a leader pattern correlator. The reference phase synchronizer is enabled only during preamble period by a signal SYNCDT generated from carrier detect 17 through circuit path 110, otherwise is reset. The digital sequence from the hard limiter 14 through circuit path 104 is clocked into shift register 50 by the N·f harmonic clock through circuit path 102. This clock signal is also connected to an input of inverter 51. The shift register 50 is (M·N−1) bit wide where M is the number of modulated symbols in a preamble sync word and N is the pulse segments in a modulated symbol. The pattern correlator 50 checks the (M·N−1) bits from shift register 50 putput plus a further bit on line 104 (total M·N bits) for the presence of sync word during second half cycle of the N·f Hz harmonic clock provided by inverter 51 output. If the circuit detects the sync word, a positive signal pulse REFSY is generated. Thus for normal condition, There is a chain of pulses REFSY generated at circuit path 108 during peramble period. This chain of pulses REFSY is used for a reference phase synchronization of the translator 15 and divider 13.

A preferred embodiment of the invention has been described but it will be appreciated that various modifications may be made by persons skilled in the art. Thus the invention is not limited to particular frequencies, sync pattern format or the number of phase segments in a modulation symbol. Moreover, if the modulation frequency is low enough (such as less than 10 KHz), the logic circuits of translator 15, reference phase synchronizer 18, divider 13 and parallel to serial converter 16 may be replaced by a processor type element which itself is a logic means. The processor according to its preset commands samples input pulses' clock periods (such as harmonic clock, data clock, limited input signal and carrier detect), manipulates logic decisions and compares results with preset ratios or values and switches its output (such as serial data clock, parallel data, reference phase signal and serial data) at proper times calculated. Most operations may be carried out concurrently in a single processor. Pulse counting method or logic operation implemented by a processor routine has been exampled in many text books.

The above stated embodiment extracts the reference phase from the preamble leader period. If there is any phase segment slip in the data field, there is less way to recover the reference phase again except a retransmission sequence is requested. Another preferred embodiment of the invention is disclosed to anticipate the problem. If the incoming signal source is further encoded with distributed sync words inside the data field, the reference phase can be extracted again by a reframing synchronization after a phase slip detected.

The basic block diagram is same as FIG. 1. The message structure shown in FIG. 6 is alternated by FIG. 8 and the reference phase synchronizer in FIG. 5 is alternated by FIG. 9.

Figure 8:
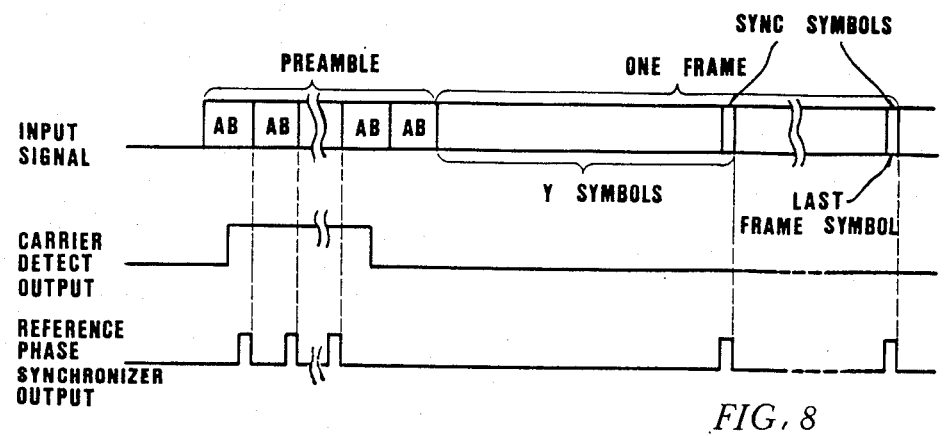
FIG. 8 is a block diagram of another embodiment's input signal structure and timing relationship to signals generated by a carrier detect and a reference phase synchronizer, and, FIG. 9 is a block diagram of another embodiment's reference phase synchronizer.

Now turning to FIG. 8, a suggested input signal message is shown. The message is leaded by a preamble repeated sync pattern and followed by a data field encoded with distributed sync words inside. Thus the data field is a type of frame structure which has X sub-frames. Each sub-frame has Y modulated symbols wide with a sync symbol at the end. A symbol is a value representing the signal interval of each modulation time slot. The repeated sync symbol fields are filled with predetermined sync words. Each sync word is preferred to be an asymmetric type to provide lower probability locking to opposite phase segments during frame resynchronization.

Figure 9:
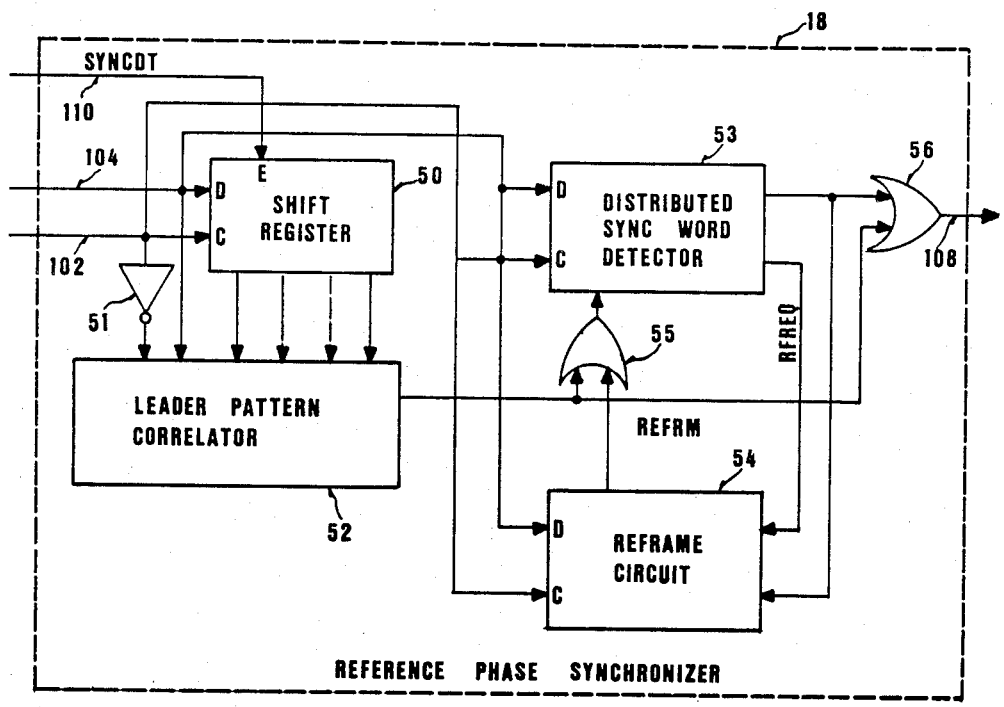

Now turning to FIG. 9, a modified reference phase synchronizer is shown. The leader reference phase synchronization circuit is same as shown in FIG. 5. The addition is mainly a distributed sync word correlator 53 and a reframe circuit 54. The data sequence from the hard limiter 14 through circuit path 104 is connected to inputs of shift register 50, leader pattern correlator 52, distributed sync word correlator 53 and reframing circuit 54. The N·f Hz harmonic clock from harmonic clock regenerator 12 through circuit path 102 is connected to leader pattern correlator 52 through inverter 51, clock inputs of shift register 50, distributed sync word correlator 53 & reframing circuit 54. During preamble period, the reference phase signal from leader pattern correlator 52 applies to synchronous reset terminal SR of distributed sync word correlator 53 through OR-gate 55. Thus the distributed sync word correlator is synchronized by the reference phase signal from leader pattern correlator 52. During data field, a full frame counter inside the distributed sync word correlator 53 counts for a full frame of data (N·X·Y bits) and verifies for the distributed sync word. If there is no error, it indicates that there is no phase segment slip in the system. A LFB signal is generated at the last bit of a full frame digital sequence. This last frame sequence bit LFB signal applies to synchronize the reframing circuit 54. It is also combined with reference phase signal from leader pattern corelator 52 by OR-gate 56 into a signal REFSY to synchronize divider 13 and translator 15 in FIG. 1. If the sync word is not detected in distributed sync word correlator 53, a slip of phase segment has been likely occured. A request to reframe signal RFREQ is generated by distributed sync word correlator 53 during LFB active period. Reframing circuit 54 accepts the reframing request signal RFREQ and carries out a reframing process of a conventional way as stated in many text books and not illustrated here. After the reframing is completed, the new position of sync word relative to the signal LBF has been obtained. A signal REFRM is generated at proper time by the reframe circuit 54 and is fed to synchronous reset terminal SR of distributed sync word correlator 53 through OR-gate 55 in order to synchronize correlator 53 to the correct time position again. Indirectly, the last frame sequence bit LFB signal and then reference phase signal REFSY are adjusted to correct time slot. As a result, the signal REFSY which is connected to demodulator 15 and divider 13i FIG. 1 synchronizes the system's phase relationship again. Since REFSY signal which is same signal as the last frame bit LFB during the data field period, it may be used for demultiplexing the frame structure data into a sub-channels data.

The second preferred embodiment of the invention has also been described. Various other modifications may be apparent without departing from the spirit of the invention.

Certain alternation of circuit is possible for hardware trade-off without changing the invention's principle. One example is the possibility to eliminate the phase locked loop shown in FIG. 4. By increasing the frequency output of harmonic clock regenerator 12 to a frequency having a common factor of phase segments and number of bits in a symbol (i.e. regenerator's output=N·n·f Hz), then both phase segment's clock signal (N·f Hz) and data clock (n·f Hz) can be divided from this common frequency source with only digital counters even if N/n is not an integer. However, it introduces the requirement of higher frequency range of the oscillator in the harmonic clock regenerator. Another alternative application of the invention is the demodulation of a MSK signal which has similar structure as the continuous PSK. Concerning the encoding of data, besides the distributed frame sync sequence mentioned before, the input signal can consist of error checking, correction coding or other partial response waveform that is not the theme of the invention.

The embodiments of the invention in which an exclusive property or privilege is claimed are defined as follows:

1. A multi-phase PSK (phase shift key) demodulator for operating upon an input signal representing a continuous N-th phase ($N=2^n$, n being a natural number) PSK modulated source with a predetermined sync preamble and outputting a binary encoded serial data independent of data pattern when said input signal being preemphasized or conditioned, said demodulator comprising:
   (a) a full wave rectifier means slicing the input signal into an uni-polar signal,
   (b) a first hard limiter means converting the uni-polar signal into a rectangular clock tracking signal source,
   (c) a harmonic clock regenerator means receiving said rectangular clock tracking signal source for reproducing a N-th time harmonic frequency source of the carrier independent of signal's data pattern and feeding said harmonic frequency source to a multi-phase translator and reference phase synchronizer,
   (d) a second hard limiter means converting the input signal into a N-th phase rectangular wave PSK signal,
   (e) said digital multi-phase translator means responding to clock output of the harmonic clock regenerator and rectangular PSK signal output of second hard limiter for producing a binary parallel data,
   (f) a frequency divider means dividing said N-th time harmonic frequency source into a serial data clock,
   (g) a parallel to serial converter means converting said parallel data into a serial one with the application of data clock,
   (h) a carrier detect means generating a one-shot signal during the preamble period to control the frequency divider and enable a reference phase synchronizer, and,
   (i) said reference phase synchronizer means extracting the reference phase signal from the preamble sync pattern to synchronize said digital multi-phase translator and frequency divider.

2. A multi-phase PSK demodulator of claim 1 wherein:
   (a) said harmonic clock regenerator means comprises a non-linear phase locked loop comparing phases only during one directional edges of said clock tracking source applied to its input,
   (b) said frequency divider means comprises either (i) a digital counter for most divisible ratios or (ii) a phase locked loop dividing circuit for all general cases,
   (c) said digital multi-phase translator means comprises a decoding circuit converting the N-th rectangular PSK signal into a parallel binary data, a counter generating a carry signal indicating decoded data ready and an error signal output indicating any illegal N-th rectangular PSK sequence or a validation of phase slip, and,
   (d) said reference phase synchronizer means comprises of a shift register and leader pattern correlator to sort the sync pattern during preamble period and to generate a chain of sync pulses synchronizing said digital multi-phase translator means and frequency divider.

3. A multi-phase PSK demodulator of claim 2 wherein said non-linear phase locked loop means further comprises:
   (a) a delay device means delaying the input signal's edge of half phase segment (i.e. $\frac{1}{2}$ Nf second, f is the modulation rate),
   (b) a synchronous latch means storing the input signal's one-direction edge and being reset by a pulse generated from a sampling latch,
   (c) said sampling latch means accepting a clock signal feedback from the following stated voltage controlled oscillator output to generate a pulse at its output after an one directional edge latched by said synchronous latch,
   (d) a sequential phase/frequency detector means comparing edges' phases from said delay device output and sampling latch,
   (e) a low pass filter means filtering said sequential phase/frequency detector's output into a direct current signal, and,
   (f) a voltage controlled oscillator means accepting said low pass filter's output to generate a frequency source of N·f Hz at its output and requiring the frequency maximum limited to less than 2 Nf Hz and minimum limited to more than 0.5 Nf Hz.

4. A multi-phase PSK demodulator of claim 1 or 2 wherein said frequency divider means for general cases comprising:
   (a) a dividing by N counter means dividing said N-th time harmonic frequency by N to have a carry signal output and accepting synchronous reset from a said reference phase signal, (b) a dividing by n counter means dividing a voltage controlled oscillator output by n and having a carry signal output, (c) a dividing by M counter means dividing said carry output of said 'dividing by n counter' by M (where M is a number of modulated symbols of a sync word) and having a carry signal output, (d) a first selector means accepting the carry signal from said 'dividing by N counter' as input during data field period and said reference phase signal as input during preamble period, (e) a second selector means accepting the carry signal from said 'dividing by n counter' as input during data field period and from said 'dividing by M counter' as input during preamble period, (f) a phase detector means comparing phases from both said selectors' outputs with a locking frequency of f Hz during data field period and f/M Hz during preamble period, (g) a low pass filter means accepting said phase detector's output into a direct current signal, and, (h) said voltage controlled oscillator means receiving said low pass filter's output to generate a n·f Hz signal output.

5. A multi-phase PSK (phase shift key) demodulator with a distributed reference phase synchronizer for operating upon an input signal representing a continuous N-th phase (N=$2^2$, n being a natural number) PSK modulated source with a predetermined sync preamble and distributed sync words in data field structure and outputting a phase self-synchronized binary enboded serial data independent of data pattern when said input signal being preemphasized or conditioned, said demodulator comprising:

(a) a full wave rectifier means slicing the input signal into an uni-polar signal, (b) a first hard limiter means converting the uni-polar signal into a rectangular clock tracking signal source, (c) a harmonic clock regenerator means receiving said rectangular clock tracking signal source for reproducing a N-th time harmonic frequency of the carrier independent of signal's data pattern and feeding said harmonic frequency to a multi-phase translator and reference phase synchronizer, (d) a second hard limiter means converting the input signal into a N-th phase rectangular wave PSK signal, (e) said digital multi-phase translator means responding to clock output of the harmonic clock regenerator and rectangular PSK signal output of second hard limiter for producing a binary parallel data, (f) a frequency divider means dividing said N-th time harmonic frequency source into a serial data clock, (g) a parallel to serial converter means converting said parallel data into a serial one with the application of data clock, (h) a carrier detect means generating a one-shot signal during the preamble period to control the frequency divider and enable a reference phase synchronization, and, (i) said reference phase synchronizer means extracting the reference phase signal from the preamble sync pattern and the distributed sync word in data field to synchronize said digital multi-phase translator and frequency divider.

6. A multi-phase PSK demodulator of claim 5 wherein:

(a) said distributed sync word in a data field structure comprises many sync symbols and an asymmetric data pattern, and, (b) said data field structure comprises a frame structure which has X sub-frames and each sub-frame has Y modulated symbols wide with a sync symbol at the end.

7. A multi-phase PSK demodulator of claim 5 wherein:

(a) said reference phase synchronizer means comprises of a shift register and leader pattern correlator to sort the sync pattern during preamble period and comprises a distributed sync word correlator and reframing circuit to sort said distributed sync word during data field, and, (b) said reference phase signal means comprises of the output of leader pattern correlator during preamble period and distributed sync word correlator output during data field to synchronize said multi-phase translator and frequency divider.

8. A multi-phase PSK demodulator of claim 5, or 7 wherein said reference phase synchronizer comprises:

(a) said distributed sync word correlator checking said sync word at the end of a frame data, (b) a reframe request signal line carrying a signal generated from said distributed sync word correlator requesting a reframe action at the reframe circuit for any detected sync word error (phase slip or misalignment), (c) said reframe circuit responding to said reframe request signal from said distributed sync word correlator for searching a correct time slot of the distributed sync word, (d) a reframe signal line carrying a signal generated at said correct time slot by the reframe circuit to reset the distributed sync word correlator and indirectly to synchronize the digital multi-phase translator and frequency divider, and, (e) said distributed sync word correlator also being reset by the output of leader pattern correlator during preamble period.

9. A multi-phase PSK demodulator of claim 5, wherein said parallel to serial converter responding to a time multiplexing frame structure data input and a distributed sync reference phase signal for producing a time demultiplexed multi-channel serial data.

10. A multi-phase PSK demodulator of claim 1 or 5 wherein said frequency divider, translator, parallel to serial converter, and reference phase synchronizer means is substituted by a processor type element which itself is a logic means.

11. A multi-phase PSK demodulator of claim 5 wherein said harmonic clock regenerator means comprises a non-linear phase locked loop comprising phases only during positive edges of said clock tracking source applied to its input further including:

(a) a delay means delaying the input signal's edge of half phase segment (i.e. $\frac{1}{2}$ Nf second, f is the modulation rate), (b) a synchronous latch means storing the input signal's positive edge and being reset by a pulse generated from a sampling latch, (c) a sampling latch means accepting a clock signal feedback from a voltage controlled oscillator output to generate a pulse at its output after a positive edge latched by said synchronous latch, (d) a sequential phase/frequency detector means comparing positive edges' phases from said delay device output and sampling latch,
(e) a low pass filter means filtering said sequential phase/frequency detector output into a direct current signal, and,
(f) said voltage controlled oscillator means accepting said low pass filter output to generate a frequency source of N·f Hz at its output and requiring the frequency source of maximum limited to less than 2 Nf Hz and minimum limited to more than 0.5 Nf Hz.

12. A method of achieving reference phase synchronization without retransmission after a phase slip or misalignment at a multi-phase PSK demodulator, comprising inputting a multi-phase PSK modulated signal source containing distributed sync words, correlating and verifying the distributed sync word for a proper reference phase position by a distributed sync word correlator, responding to a request of reframing due to a phase slip or misalignment indicated by the distributed sync word correlator as to resort a correct time slot of the distributed sync word by a reframe circuit, and resetting the sync word word correlator and synchronizing internal operations of said multi-phase PSK demodulator at said correct time slot provided by the reframe circuit to complete the reference phase synchronization.

* * * * *